2,996,352
PRECIPITATION OF PLUTONOUS PEROXIDE

James G. Barrick, Cleveland, Ohio, and Jean P. Manion, New Haven, Conn., assignors to the United States of America as represented by the United States Atomic Energy Commission No Drawing. Filed Jan. 26, 1954, Ser. No. 406,377
7 Claims. (Cl. 23—14.5)

The present invention relates in general to processes for the production of plutonium, and more particularly to an improved method for precipitating plutonous peroxide from aqueous solutions containing plutonium values.

As is known, plutonium—more specifically the 239 isotope of plutonium—is conventionally produced by transmutation of uranium effected by subjecting natural uranium to neutron irradiation. In current practice, the product thus obtained is ordinarily a mass of irradiated uranium containing a concentration of the order of 0.02% plutonium and a like concentration of uranium fission products. However, the presence of even small amounts of uranium or fission products usually interferes with the ultimate applications of plutonium. This is especially true with respect to the fission products—isotopes having atomic numbers ranging predominantly from 30 to 63—which are in general highly radioactive and therefore greatly deleterious from both physiological and technical standpoints. Accordingly, for successful utilization, the small proportion of plutonium so produced must be isolated and recovered from the materials associated with it in the irradiated mass.

Details of such isolation and recovery operations are set forth in co-pending applications of the common assignee:

S.N. 519,714, filed January 26, 1944, now U.S. Patent No. 2,785,951, issued March 19, 1957, in the names of Thomson and Seaborg, for Bismuth Phosphate Process for the Separation of Plutonium from Aqueous Solutions, S.N. 174,592, filed July 18, 1950, in the names of J. E. Willard and D. E. Koshland, Jr., for Method for Dissolving Lanthanum Flouride, and S.N. 282,277, filed April 14, 1952, in the name of David M. Ritter, and now abandoned, for Improved Oxidation of Plutonium.

The final step in such processes ordinarily involves employing hydrogen peroxide to precipitate plutonium values as plutonous peroxide from a solution which is about one normal in nitric acid and contains in the order of 5 to 8 grams per liter of dissolved plutonium, about 37 grams per liter of dissolved lanthanum and extraneous contaminants, such as manganese and particularly iron.

It is with the aforesaid final step of precipitating plutonium from aqueous solution as plutonous peroxide, that the present invention is primarily concerned.

In accordance with conventional plutonium production plant procedure for effecting plutonous peroxide precipitation at this point, the system is usually maintained cooled—particularly to the range of 0° to 20° C.—throughout the precipitate formation and segregation operations.

For further details concerning the refrigeration measure for improved plutonous peroxide precipitation, reference may be made to a co-pending application of the common assignee directed to the same:

S.N. 402,830, filed January 7, 1954, in the name of Burt F. Faris, for Precipitation of Plutonous Peroxide.

However, while precipitation as plutonous peroxide, particularly under the conditions of reduced temperature, has proven fundamentally successful for recovering dissolved plumonium from such production plant solutions, still it has not shown itself to be unqualifiedly satisfactory for the purpose. In particular, the amounts of plutonium left remaining in solution upon the plutonous peroxide precipitation were consistently substantially greater than theoretically expectable. Laboratory determinations indicate the solubility of plutonous peroxide in ca. one normal nitric acid solution to be considerably below 50 milligrams dissolved plutonium per liter—i.e., about 20 to 30 milligrams plutonium per liter—despite the presence of 30 to 50 grams per liter of dissolved trivalent lanthanum ions. However, upon proceeding to recover plutonium from these plant solutions, the amounts of plutonium left in solution unprecipitated generally were well above 50 milligrams plutonium per liter, and often greater than 100 milligrams plutonium per liter. This occurred despite the provision of a subsantial stoichiometric excess of the precipitant— i.e., so much as 10% by weight of excess of $H_2O_2$—and allowing several hours for the precipitation in order to insure substantial completion of all reaction that was in any way imminent. This shortcoming was encountered not only in production-scale operations, but also in very carefully conducted precipitations effected on laboratory scale upon samples of plant and semi-works solutions.

Accordingly, one object of the present invention is to provide an improved process for precipitating plutonous peroxide which is especially amenable to operation under conditions whereby the system is cooled to temperatures approximating the range of 0° to 20° C.

Additional objects will become apparent hereinafter.

In accordance with the present invention, substantial improvement, to a process in which plutonium is precipitated as plutonous peroxide from an aqueous inorganic acid solution containing dissolved plutonium, comprises the step of subjecting said solution, prior to the precipitation of plutonous peroxide, to the action of a nitrogen-containing reducing agent of the class consisting of hydroxylamine sulfate and hydrazine sulfate. Applicants have found that upon application of this improvement step to conventional operations for the precipitation of plutonous peroxide from such solutions— especially where the precipitation is effected by incorporating a stoichiometric excess of hydrogen peroxide as the precipitant in the plutonium-containing solution approximating one normal in nitric acid, while maintaining the solution cooled throughout precipitation to a temperature approximating the range of 0° to 20° C.—the same is beneficially effective in largely avoiding the occurrence of excessive amounts of plutonium remaining unprecipitated in solution, and thus serves to promote substantially quantitative precipitation yields of plutonium from the solution as plutonous peroxide. As the underlying mechanism involved, the efficacy of applicants' improvement step is attributed to reduction of a significant proportion of the plutonium, present in hexavalent state in the solution. Plutonium will effectively precipitate as peroxide only in the tetravalent state, but not in its trivalent, pentavalent, or hexavalent oxidation states. Previously, it was expected and accepted in the art that the plutonium values involved, in view of process history, would be in the tetravalent state directly prior to the peroxide precipitation step. Moreover, the oxidation state of plutonium in the initial solution was believed to be immaterial anyway; as aqueous hydrogen peroxide is recognized as an effective reductant for plutonium in pentavalent and hexavalent states, serving to convert the same to tetravalent state, and further happens to be an effective oxidant for trivalent plutonium, converting the same also to tetravalent state, it was expectable that amounts of plutonium, when dissolved in other than the tetravalent oxidation state at the outset, should become automatically converted to tetravalent state upon the commencement of hydrogen peroxide addition. Nevertheless, spectrophotometric analyses have revealed that as much as 50 to 60% of the plutonium content of such solutions arriving for peroxide precipitation in conventional plutonium production plant operations, obtains in hexavalent oxidation state. Furthermore, it appears that hydrogen peroxide reduction of hexavalent plutonium becomes progressively slower and more torpid and ineffective in proceeding from room temperatures down through temperatures to the range of 0° to 20° C. The occurrence of so much of the plutonium in hexavalent state in production plant and semi-works solutions, evidently a function of the past processing history of the plutonium, is believed attributable to contaminants and impurities, chiefly ferric ion, still associated with the plutonium. The ferric ion contamination, stemming from corrosion of the stainless steel vessels within which the plutonium values in solutions had been processed earlier in the overall production procedure, being a strong oxidant, evidently effects and/or promotes oxidation of a sizeable portion of the plutonium content to the hexavalent state. Now, applicants have found that in application of their instant improvement step, both hydroxylamine sulfate, and separately hydrazine sulfate, when incorporated even in fractional molar concentrations, are especially rapid and thorough in converting substantially the entirety of such amounts of plutonium from unexpected hexavalent state to a completely precipitable state. This they do even in the presence of potent amounts of ferric ion contamination—i.e., at least as great as 0.01 to 0.05 molar $Fe^{+3}$. Of even greater significance, these reagents, in contradistinction to the hydrogen peroxide, have proven to be operative and effective in functioning with such rapidity and thoroughness in solutions maintained cooled in the liquid state—especially to temperatures within the range of 0° to 20° C. Aside from service as a reductant, the presence of these reagents does not interfere with or adversely affect subsequent precipitation of the resulting plutonous ions as peroxide. Otherwise, these reagents are particularly amenable to being associated with plutonium at this stage in plutonium production operations. That is, the reagents introduce no metal cation, so as to impose additional difficultly-removable contamination upon the plutonium. Furthermore, whatever amounts of these reagents may remain unexpended in solution are automatically destroyed upon the introduction of the hydrogen peroxide for the precipitation of the plutonous peroxide; thus, these reagents generally do not remain as subsisting contamination in the supernatant solution remaining after precipitation to interfere in any way with desirable recycling of the supernatant to earlier points in the production scheme. In practice, for example, in applying applicants' improvement step prior to conventional peroxide precipitation upon solutions arriving for peroxide precipitation in the aforementioned standard plutonium production operation on semi-works scale, it was found that upon pre-treating the solution for about ¼ to ½ hour, prior to peroxide precipitation, with hydroxylamine sulfate or hydrazine sulfate introduced to ca. 0.2 molar, reduction of the amounts of plutonium left unprecipitated in the supernatant to below 50 milligrams per liter, upon plutonous peroxide precipitation, is afforded. Being of such efficiency, and having such beneficial attributes, the present improvement step clearly affords substantial practical advantages in plutonous peroxide precipitation and recovery.

In conducting the present invention, the solution should be maintained acidic throughout the entirety of the application of applicants' instant improvement step and the plutonous peroxide precipitation operation, in the interest of avoiding the occurrence of polymerization and colloidality of dissolved plutonium ions which tend to occur in dilute solutions under more alkaline conditions. The particular pH values at which tetravalent plutonium ions commence to manifest such polymerization and colloidality are outlined in Table I below; in general, it is desirable that the solutions be maintained constantly more acidic than the pertinent pH level indicated in Table I.

TABLE I

Approximate pH's above which polymerization and colloidality of tetravalent plutonium becomes prevalent in aqueous nitric acid solutions

| Concentration of $Pu^4$: | pH |
|---|---|
| $10^{-5}$M | 3 |
| $10^{-4}$ | 2½ |
| $10^{-3}$ | 2 |
| $10^{-2}$ | 1½ |
| $10^{-1}$ | 1 |

At much greater acidities, though, the solubility of plutonous peroxide adversely increases. For providing the acidity with aqueous mineral acid, nitric acid is preferred. Aqueous nitric acid containing a proportion of sulfuric acid therewith is also well suited for the purpose. For plutonium concentrations approximating 5 to 8 grams per liter, as encountered in production solutions ready for peroxide precipitation, nitric acid concentrations within the approximate range of 0.5 to 2 normal are in order, while ca. one normal $HNO_3$ is particularly preferred.

Having provided a solution of such derivation, applicants' instant improvement step is applied thereto, prior to pultonous peroxide precipitation. Straightforwardly, one of the specified reagents—viz. either hydroxylamine sulfate, $NH_2OH \cdot \frac{1}{2}H_2SO_4$, or hydrazine sulfate, $NH_2NH_2 \cdot H_2SO_4$—is introduced and dissolved into the solution. Between the two reagents, the former appears to be slightly more efficient, although both are eminently effective for the purpose. Concerning the concentration of reagent to be employed, it is advisable to employ a substantial stoichiometric excess over dissolved plutonium and ferric ion present, and in addition over any other materials present in the solution which might possibly be reduced by the reagent, in order to insure that the entirety of the plutonium of valence higher than tetravalent becomes properly reduced. However, since the remaining excesses of these reagents are destined to react with, and consume, hydrogen peroxide added later during the plutonous peroxide precipitation operation, it is desirable that extravagant excesses be avoided. Representatively, in the case of plutonium production plant solutions, as aforesaid, containing dissolved plutonium concentrations approximating 0.03 molar, ferric ion concentrations approximating 0.01 molar, and free from significant concentrations of any other material reducible by these reagents, it has been found that reagent concentrations within the approximate range of 0.1 to 0.5 molar are especially efficient and practical. Room temperature is quite satisfactory for the entirety of the instant pre-treatment operation, although maintaining the solution cooled in liquid state to 20° or below is suitable. Thereupon, the hydroxylamine and/or hydrazine reagent employed serves to reduce hexavalent and pentavalent plutonium ions to the tetravalent state, ferric ions to the ferrous oxidation state, and other reducible ions present in a similar manner. Normally only a few minutes is required for completion of this pre-treatment step; 15 to 30 minutes normally provides ample time for insuring completeness of the plutonium reduction reaction. The solution may be agitated throughout the duration of this pre-treatment, although such agitation is normally of little additional benefit.

Thereupon the conventional plutonous peroxide precipitation is effected in the so-pretreated solution. It is deemed best to effect the peroxide precipitation immediately after the hydroxylamine or hydrazine reagent pre-treatment toward avoiding chance reoxidation of the plutonium ions to beyond the tetravalent state. Hydrogen peroxide is the preferred precipitant. Use of hydrogen peroxide, rather than other simple peroxide compounds such as sodium peroxide, is desirable for avoiding possible further contamination of plutonium with a metal cation of the precipitant. To mitigate undesirable excessive further dilution of the solution by the precipitant, it is advantageous to add hydrogen peroxide in concentrated aqueous form; 30% aqueous $H_2O_2$ is appropriate. The added hydrogen peroxide, in addition to reacting with tetravalent plutonium ions in solution to form a precipitate of plutonous peroxide therewith, also reacts with any remaining unexpended hydrazine and/or hydroxylamine reagent in solution to destroy the same In this, the hydrogen peroxide serves to oxidize the hydrazine component, initially forming mainly hydrazoic acid plus some ammonia, and it likewise serves to oxidize the hydroxylamine component so as initially to form mainly nitrogen and oxides of nitrogen; the hydrogen peroxide involved in such reaction is itself reduced to water. Too, the added hydrogen peroxide also serves to oxidize any plutonium ions occurring in trivalent state to the tetravalent state proper for the plutonous peroxide precipitation. Furthermore upon the destruction of the hydroxylamine or hydrazine reagent, and thereupon in the presence of hydrogen peroxide and nitric acid, ferrous ion in solution become oxidized to the ferric oxidation state. Accordingly, addition of hydrogen peroxide to a substantial stoichiometric excesss over that theoretically required for all of these several reactions is in order toward promoting completeness of reaction with plutonium; adding sufficient hydrogen peroxide to make the resulting solution 10% by weight in a stoichiometric excess thereof is well suited. The presence of dissolved lanthanum ions, even as ordinarily present in concentration of ca. 30 to 50 grams per liter, proves not to interfere noticeably with the pre-treatment with hydroxylamine or hydrazine reagent, or the accompanying precipitation of plutonous peroxide. Upon its formation, the plutonous peroxide may simply be permitted to settle from the solution by gravity and thus segregate itself from its supernatant liquid.

The presence of sulfate ions in the solution is frequently desirable for reason that it seems to enhance somewhat the settling and filterability qualities of the peroxide precipitate obtained. That is, when plutonous peroxide is precipitated in the presence of sulfate ions, the precipitate obtained appears to be a darker green, of somewhat larger particle size, and of somewhat lower solubility than that precipitated in the absence of sulfate. In this regard, sulfate ions may be present in the form of sulfuric acid; approximately 0.05 to 0.5 molar sulfate ion is appropriate, while ca. 0.1 molar sulfate ion is particularly preferred. The use of the sulfate form of the hydroxylamine and hydrazine reagents is therefore beneficial in this connection. Where addition of sulfate ion to an existing plutonium solution is desired for this purpose, its addition in the form of ammonium sulfate is advantageous; this avoids further increasing the acidity of the solution, while the readily-eliminable ammonium cation avoids further contamination of the plutonium with additional metal cations at this point.

In the presence of ferric ion—especially when concentrations approximating 0.01 molar as encountered in the aforesaid plutonium production operations—it is preferable and customary that the solution be maintained cooled to substantially within the range of 0° to 20° C. throughout precipitation employing the two-temperature precipitation procedure described in detail in the aforementioned co-pending patent application.

Generally speaking, the time required for accomplishing effective formation of the plutonous peroxide precipitate under these conditions ranges from about 15 minutes to two hours; one hour is usually an efficient duration. After adding, at the outset, an initial quantity of hydrogen peroxide somewhat more than sufficient to react with all of the hydroxylamine or hydrazine reagent remaining in the solution, it is advisable to add the remainder of the aqueous hydrogen peroxide to the solution gradually over at least the first 15 minutes of the period of precipitate formation and better over a full hour; since the reaction of plutonium with the hydrogen peroxide is slow at or below 20° C., this provides the $H_2O_2$ as it is needed, while mitigating the amount of $H_2O_2$ exposed to decomposition in the solution as the reaction proceeds. For conducting the special two-temperature procedure, the plutonous peroxide precipitate is initially formed with the foregoing timing at 20° C., whereupon the temperature of the system is dropped to the lower level; a period of from 5 to 9 hours in the 0° to 10° C. range is usually needed for substantially complete settling of the formed plutonous peroxide from the quiescent solution. Although it has been found that slightly more complete settling of the suspended plutonous peroxide may be realized upon extending the period within the 0° to 10° C. range to 24 hours, this is normally unwarranted. However, in practice, where the remaining supernatant after the precipitate formation and settling is recycled to earlier points in the plutonium production operation to thereby avoid loss of the unsettled plutonium therein, a settling period in the 0° to 10° C. range of only two hours is ordinarily adequate as a practical matter.

The selection of particular apparatus for conducting the present operations of hydroxylamine or hydrazine pre-treatment, together with subsequent plutonous peroxide precipitation, especially under conditions whereby the solution is cooled, is non-critical and may be similar to, and employed in the same manner as, apparatus described in the aforementioned co-pending patent applications.

As a matter of caution, where the plutonium being processed is in the form of one of the fissionable isotopes thereof, the apparatus should best be of sufficiently small size to avoid the accumulation of a supercritical chain-fission-reactive amassment of plutonium in any one batch undergoing precipitation; as a rule of thumb, where isotopically pure plutonium-239 is being processed, no more than 250 grams of plutonium should be assembled together at any one time.

Further illustration of the quantitative aspects and preferred procedures of the present invention is provided in the following specific examples.

The examples demonstrate the substantial improvement provided by applicants' instant pre-treatment step in the extent of recovery of plutonium by precipitation as plutonous peroxide in a conventional manner, as compared with the extent of recovery in the absence of such pre-treatment, or afforded upon reliance upon hydrogen peroxide alone for reduction of hexavalent plutonium even under the supposedly optimum conditions of 1% $H_2O_2$ at 50° C.

EXAMPLE I

A sample of aqueous acidic plutonium solution was withdrawn from each of a series of separate runs in conventional plutonium production operations on a semi-works scale. Generally, the conventional plutonium production operation practiced commenced with concentrated nitric acid dissolution of neutron-irradiated uranium metal, dilution, soluble complexing of the uranium in the resulting solution with aqueous sulfuric acid, and thereupon, while maintaining the plutonium in solution in teravalent oxidation state, selective carrier precipitation of the plutonium from solution, away from the bulk of the solubly complexed uranium, upon a bismuth phosphate carrier precipitate. After concentrated nitric acid dissolution of the resulting plutonium-containing bismuth phosphate carrier precipitate, the resulting dissolved plutonium was subjected to a plurality of carrier precipitation cycles employing bismuth phosphate as the carrier, followed by one carrier precipitation cycle employing lanthanum fluoride as the carrier, as generally described hereinbefore, concluding with a lanthanum fluoride carrier precipitate carrying a major portion of the original plutonium in tetravalent state. Virtually all such operations were conducted in aqueous nitric acid media in stainless steel apparatus. In each run, the resulting plutonium-carrying lanthanum fluoride precipitate was metathesized to a plutonium-carrying lanthanum hydroxide precipitate by digesting in 15% aqueous potassium hydroxide at ca. 75° C. for ca. 1½ hours. In each case the resulting plutonous-hydroxide-containing lanthanum hydroxide precipitate, contaminated with ferric hydroxide, was dissolved in 60% aqueous $HNO_3$ and then diluted to approximately one normal in nitric acid, producing a solution approximating 30 to 40 grams per liter in dissolved lanthanum, and approximating 500 milligrams per liter in dissolved plutonium. In some cases, after withdrawal, the solution contained considerable concentrations of dissolved bismuth, which had been added for somewhat different experimental reasons at this point, as well as a slight concentration of dissolved zirconium. It was at this point in each semi-works run that the aforesaid sample of the obtaining solution was separately withdrawn.

Each of the solution samples so derived was made 0.2 normal in $H_2SO_4$, and divided into a number of smaller portions. Thereupon, as a pre-treatment step in accordance with the present invention, into some of the portions of solution was added hydroxylamine sulfate to 0.2 molar, whereupon the solution was maintained at room temperature—viz. ca. 25° C.—for 30 minutes. Into other portions of solution, aqueous 30% hydrogen peroxide was added to 1% by weight, whereupon the solution was maintained heated to 50° C. for 1 hour, for purposes of comparison with the hydroxylamine sulfate pretreatment procedure. Still other of the solution portions were given no such pre-treatment whatever.

Immediately thereafter each of the solution portions was treated in substantially the same manner. All solution portions were maintained cooled to 10° C. throughout; 30% aqueous hydrogen peroxide was added gradually over a 30 minute period to a concentration of 10% by weight of stoichiometric excess $H_2O_2$. This was followed by a 60 minute digestion period at 10° C., with stirring. After segregating the formed plutonous peroxide precipitate by vigorous centrifugation, the remaining supernatant liquid in each case was analyzed for plutonium, and the manifested solubility of plutonous peroxide under the conditions was determined. Analyses of the original withdrawn solutions, and the results obtained, are tabulated in Table II below.

TABLE II

Precipitation of plutonous peroxide from semi-works solutions in conjunction with various pretreatment procedures

| Semi-Works Run No. | Analysis of Initial Solution | | | | | Manifested Solubility of Plutonous Peroxide (mg. Pu/liter) | | |
|---|---|---|---|---|---|---|---|---|
| | Pu (mg./l.) | Fe (M) | Zr (M) | Bi (mg./l.) | $HNO_3$ (N) | No Pretreatment | Pretreated With 1% $H_2O_2$ | Pretreated With $NH_2OH \cdot \tfrac{1}{2}H_2SO_4$ |
| 284–85 | 513 | 0.0062 | -------- | ------------ | 1.37 | 163 | 56 / 61 / 66 | 31 |
| 286–87 | (498) | 0.0051 | nil | 1,770 | 1.2 | 92 / 110 | 49 / 73 | 35 |
| 288–91 | 595 | (0.006) | nil | 652 | 1.02 | 134 | 54 / 75 | 20 |
| 292–93 | 510 | 0.0075 | $10^{-5}$ | 1,300 | 1.22 | 169 | 144 / 99 | 21 |
| 297–99 | 413 | 0.0064 | nil | 618 | 0.98 | 150 | 92 / 89 | 24 |

EXAMPLE II

Several portions of a solution sample, withdrawn from one of the semi-works runs involved in Example I—to wit: Run No. 286–87—in the manner described in Example I, were provided.

One pair of the solution portions were each made 0.1 molar in added hydroxylamine sulfate and were digested for 20 minutes at 20° C. Another pair of portions were each made 0.25 molar in added hydroxylamine sulfate, and likewise were digested for 20 minutes at 20° C. Still another pair were each made 0.25 molar in added hydrazine sulfate, and were digested 20 minutes at 20° C. A final pair of solution portions were each made 0.2 normal in $H_2SO_4$ and 1% by weight in hydrogen peroxide, and were digested at 50° C. for one hour.

Immediately thereafter each of the solution portions was treated in substantially the same manner. All solution portions were maintained cooled to 10° C. throughout and plutonous peroxide was precipitated therefrom by addition of 30% aqueous hydrogen peroxide in the same manner as in Example I. Results are tabulated in Table III below.

TABLE III

Effect of variation of pretreatment reagents and conditions

| Pretreatment Reagent | Manifested Solubility of Plutonous Peroxide (mg./l.) |
|---|---|
| 0.1 M $NH_2OH \cdot \tfrac{1}{2}H_2SO_4$ (=0.1 N $H_2SO_4$) | 39 / 30 |
| 0.25 M $NH_2OH \cdot \tfrac{1}{2}H_2SO_4$ (=0.25 N $H_2SO_4$) | 29 / 40 |
| 0.25 M $NH_2NH_2 \cdot H_2SO_4$ (=0.5 N $H_2SO_4$) | 47 / 48 |
| 1% $H_2O_2$ at 50° C. (+0.2 N in $H_2SO_4$) | 66 / 80 |

The following Example III demonstrates progressive decrease in effectiveness with decreasing temperature of hydrogen peroxide for reducing hexavalent plutonium.

EXAMPLE III

Employing non-ferrous laboratory equipment, four portions of aqueous acidic plutonium solution were prepared and provided. All were ca. 1 normal in nitric acid, ca. 0.2 normal in sulfuric acid, and contained about 400 milligrams dissolved plutonium per liter, all in hexavalent oxidation state. Two of the portions contained no dissolved lanthanum, while the other two contained ca. 37 grams dissolved lanthanum per liter. One solution portion with lanthanum and one solution portion without lanthanum were maintained cooled to 10° C. throughout subsequent operations, while the other two solution portions were maintained cooled to 20° C. 30% aqueous hydrogen peroxide was added to each solution over a 30 minute period to a concentration of 10% by weight of stoichiometric excess hydrogen peroxide, which was followed by a 60 minute digestion period. In the case of solutions maintained at 10° C., no precipitate immediately formed; this is interpreted as indicative that none of the hexavalent plutonium had yet been reduced to tetravalent state. Plutonous peroxide was noted to have precipitated, though, in the solution portions maintained at 20° C. immediately thereafter all solutions were vigorously centrifuged, for segregation of any precipitate therein, and the apparent solubilities of plutonium in the remaining supernatant liquid was immediately determined. Results are tabulated in Table IV below.

TABLE IV

*Effect of hydrogen peroxide on hexavalent plutonium solutions at refrigerated temperatures*

| Temperature (° C.) | Lanthanum (gm./liter) | Manifested Solubilities of $PuO_4$ (mg. Pu/liter) |
|---|---|---|
| 10 | 0 | No precipitate. |
| 10 | 37 | Do. |
| 20 | 0 | 155. |
| 20 | 37 | 169. |

As a matter of terminology, it is to be understood that the expression "plutonous peroxide," as used throughout this specification and appended claims for denoting the precipitate formed in the instant process, is intended to embrace not only the discrete, chemically-pure compound so named, but also general technical precipitates—often impure and non-discrete—formed by the aqueous reaction of the peroxide anion with the tetravalent plutonium cation. More particularly, while the discrete compound is that having conventionally ascribed to it the formula $PuO_4$, it ordinarily tends to assume its monohydrate form $PuO_4 \cdot H_2O$ when formed in an aqueous medium. Furthermore, when precipitated from technical aqueous solutions, in the presence of various anions, the resulting plutonium precipitate tends to include significant quantities of such anions. For example, in the presence of even fractional molar concentrations of sulfate ion, the peroxide precipitate ordinarily contains considerable quantities of sulfate which resist removal by extensive washing; molar ratios of plutonium to sulfate of 2.6 through 3.0 are typical. Similar incorporation in the precipitates of nitrate, possibly acetate, and other anionic radicals which may be present in the system is likewise indicated. Normally, though, in addition to such other anionic radicals, the constitution of the precipitate includes at least three atoms of oxygen per atom of plutonium. As a possible generalization, these technical precipitates may supposedly be constituted of one or a mixture of components of formula $Pu_yO_{3y+z} \cdot X \cdot nH_2O$, where X may comprise $SO_4^{-2}$, $NO_4^{-1}$, $O^{-2}$, or other anionic radical. Beneficial applicability of the instant procedure is contemplated to extend broadly to the formation of all such precipitates. Accordingly, the expression "plutonous peroxide" is intended as generic to all precipitates of such origin, regardless of possible variations in their precise molecular structure stemming from the presence of extraneous radicals.

Likewise, it is to be understood that the term "hydroxide" as used herein and in the appended claims signifies the class of basic compounds which includes hydrated oxides in addition to true hydroxides.

While the sulfate forms of hydroxylamine and hydrazine have been emphasized hereinabove as reagents appropriate for effecting the present improvement step, it is to be understood that it is the respective base itself—viz. hydroxylamine ($NH_2OH$), or hydrazine ($NH_2NH_2$)—that is primarily effective in accomplishing the beneficial result of the instant improvement step. Accordingly, other reasonably soluble forms of these particular bases—e.g., hydroxylamine hydrochloride ($NH_2OH \cdot HCl$), and hydroxylamine nitrate $$(NH_2OH \cdot HNO_3)$$

—may also be employed within the scope of the present invention. Too, either of the free bases—hydroxylamine or hydrazine—themselves may be employed; these are advantageously more soluble than the sulfate, hydrochloride, and nitrate forms, but in contradistinction when stored for protracted periods as reagents prior to use tend to undergo deleterious decomposition.

While this invention has been described in the foregoing examples with particular reference to its application to conventional plutonium production operations involving bismuth phosphate, and subsequent lanthanum fluoride carrier precipitation cycles, followed by the metathesis to the plutonous-hydroxide-carrying lanthanum hydroxide precipitate, its applicability is by no means so restricted. The instant improvement step may beneficially be applied to the precipitation, as peroxide, of plutonium from mineral acid solutions of metal hydroxide mixtures with different past histories and derived through various other procedures. Moreover, while this invention has been described with particular reference to its application to the processing of specifically plutonium-239, it is inherently of much wider applicability. The present method is equally well adapted to such processing of other plutonium isotopes, for example the non-fissionable Pu-238 isotope. Pu-238, valuable as a radioactive tracer, may be derived from non-fissionable sources through application of bismuth phosphate in lanthanum fluoride carrier precipitation cycles in ferrous metal apparatus wherein the present improvement step in peroxide precipitation may advantageously be employed in the recovery of the same. Various additional applications of the instant method will become apparent to those skilled in the art. It is therefore to be understood that all matters contained in the above description and examples are illustrative only and do not limit the scope of the present invention.

What is claimed is:

1. In a process in which plutonium is precipitated as plutonous peroxide from an aqueous inorganic acid solution containing dissolved plutonium, the improvement which comprises subjecting said solution, prior to the precipitation of plutonous peroxide, to the action of a nitrogen-containing reducing agent of the class consisting of hydroxylamine and hydrazine, said reducing agent being provided in said solution in a quantity which is in stoichiometric excess of the quantity required to reduce all of said plutonium to the tetravalent oxidation state, whereby at least a portion of said plutonium is reduced to the trivalent oxidation state.

2. The improvement step of claim 1 wherein said nitrogen containing reducing agent is hydroxylamine sulfate.

3. The improvement step of claim 1 wherein said nitrogen-containing reducing agent is hydrazine sulfate.

4. The improvement step of claim 1 wherein said solution approximates 30 to 50 grams per liter in trivalent lanthanum ion, five to eight grams of dissolved plutonium per liter, 0.01 molar in ferric ion, and one normal in nitric acid, and wherein said step of subjecting to the action of a nitrogen-containing reducing agent is effected by incorporating the sulfate compound of said reducing agent into said solution to a concentration approximating the range of 0.1 to 0.5 molar.

5. The improvement step of claim 1 wherein said solution approximates 30 to 50 grams per liter in trivalent lanthanum ion, five to eight grams of dissolved plutonium per liter, 0.01 molar in ferric ion, and one normal in nitric acid, and wherein said step of subjecting to the action of a nitrogen-containing reducing agent is effected by incorporating the sulfate compound of said reducing agent into said solution to a concentration approximating 0.2 molar.

6. The improvement step of claim 1 wherein said solution contains a relatively large concentration of lanthanum, a relatively small concentration of plutonium and at least a trace of ferric ions, and wherein said solution is approximately 0.5 to 2 normal in nitric acid and wherein said nitrogen-containing reducing agent is incorporated in substantial stoichiometric excess into said solution.

7. In a process in which plutonium is precipitated as plutonous peroxide from an aqueous inorganic acid solution containing dissolved plutonium, the improvement comprising subjecting said solution, prior to the precipitation of plutonous peroxide, to the action of hydroxylamine sulfate, said hydroxylamine sulfate being provided in said solution in a quantity which is in stoichiometric excess of the quantity required to reduce all of the plutonium to the tetravalent oxidation state, whereby at least a portion of said plutonium is reduced to the trivalent oxidation state, and thereafter precipitating plutonous peroxide by maintaining the resulting solution at a temperature of approximately 20° C., thereupon introducing a stoichiometric excess of aqueous hydrogen peroxide gradually into the solution so maintained at 20° C. to thereby form a plutonous oxide precipitate, thereafter reducing the temperature of the plutonous peroxide-containing solution to a temperature within the range of 0° to 10° C., to thereby promote settling of said plutonous peroxide precipitate from the body of said solution and subsequently decanting the aqueous supernatant liquid from the settled plutonous peroxide precipitate.

References Cited in the file of this patent

Harvey et al.: Journal of the Chemical Society (London), 1947, pages 1010–1021.

Mastick et al.: U.S. Atomic Energy Commission declassified document MDDC-1761, page 3. Declassified Feb. 25, 1948.